Figure 1:
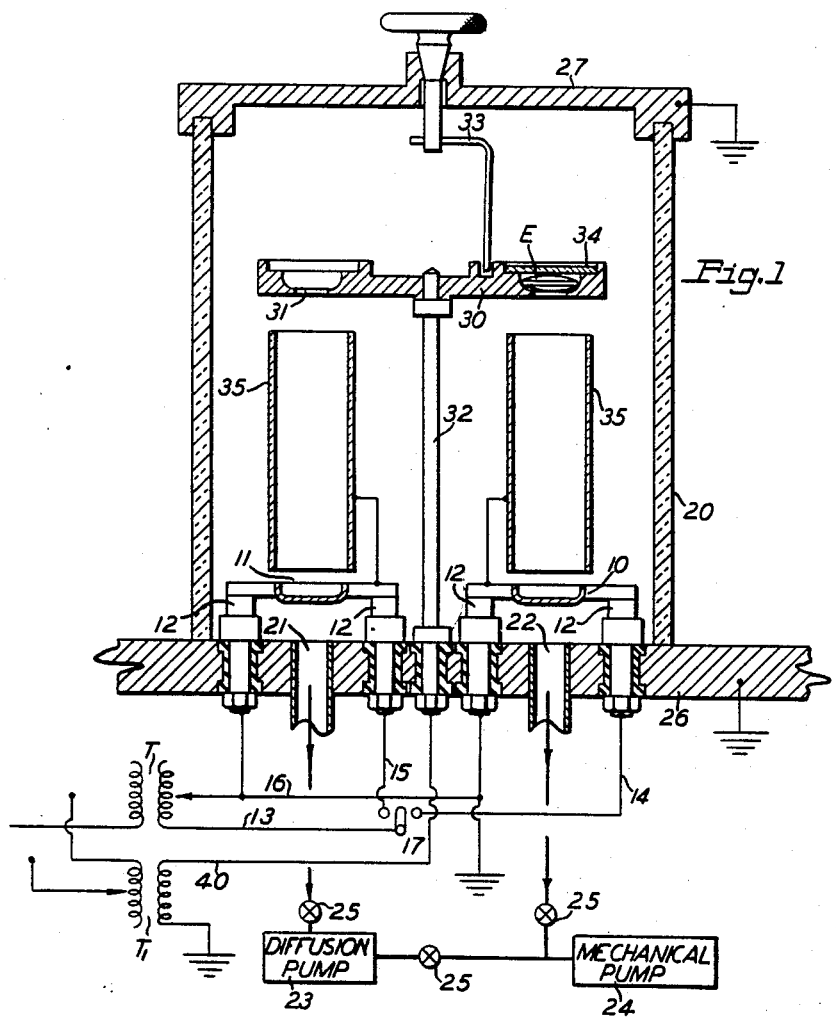

Inventors
William C. Miller
Dorothy L. Richards
By Bakelew & Leautebury
Attys.

Patented Dec. 25, 1945

2,391,595

UNITED STATES PATENT OFFICE 2,391,595

NONREFLECTIVE LENS COATING

Dorothy Llewellyn Richards, Azusa, and William C. Miller, Alhambra, Calif., assignors to Vard Inc., Pasadena, Calif., a corporation of California Application November 27, 1942, Serial No. 467,094

5 Claims. (Cl. 88—1)

This invention has reference to coating the surfaces of transparent elements, such as the surfaces of optical lenses and prisms, to reduce and minimize surface reflection, the general purpose of the invention being to produce a coated surface of high non-reflective efficiency and also of high physical durability.

John Strong (Optical Society of America, v. 26, p. 73, January, 1936) has shown that reflection from the surface of a transparent element could be reduced to zero, for any chosen wave length by coating the surface with a film of normally solid material one-quarter wave length thick, providing the refractive index of the film was made equal to the square root of the index of the transparent material. Fluorite (calcium fluoride) was suggested as having an index approaching the ideal for coating optical glass. No suitable coating material with an index sufficiently low has as yet been discovered or produced to reduce glass surface reflection to approximately zero, but various metallic fluorides such as those of sodium, lithium and calcium have sufficiently low indices to give good results. Cartright and Turner in their later Patent 2,207,656, July 9, 1940, suggest the fluorides of lithium, magnesium, calcium, sodium and sodium-aluminum (cryolite).

The difficulty attendant all such films, and which we have overcome, is their very low physical resistance or durability. The films have characteristics of softness, are easily scratched and abraded, and are very easily parted from the glass surface by any ordinary cleaning method. Under adverse conditions they may develop a fogginess in which condition their structure under high magnification appears discretely crystalline and like a mosaic instead of homogeneous. And the films are peculiarly susceptible to moisture which appears to make them still more easily abraded and disintegrated.

Cartright and Turner suggested the use of a very thin protecting over-layer of quartz or zircon placed over a reflection reducing under-layer of magnesium fluoride, the under-layer to be substantially of the full quarter-wave-length thickness. The high refractive indices of such covering materials precludes their use as a film for decreasing reflectivity, and it was suggested that such an over-film be made very thin so that its thickness would contribute no appreciable part of the total quarter-wave-length thickness of the whole film. We have found, however, that such a very thin over-layer gives little or no physical resistance to the films, and to make those over-layers thick enough to give adequate physical resistance is to destroy the non-reflective efficiency.

Another difficulty which our invention overcomes is that of non-adherence to the glass or other optical surface. Ordinary films of the known types seem to part completely from the glass surface when very lightly scratched or abraded, and their susceptibility to moisture seems to facilitate their disintegration and parting from the glass. The slightest abrasion removes the material. Adhesion to the glass surface seems to be as important as physical resistance in the film itself; in fact the quality of adherence seems to be a necessary factor of physical resistance. It has been proposed that a separate very thin adhering layer (of such material as chromium) be first deposited on the glass surface, followed by the low index film; but that procedure has at least the disadvantage that the resultant composite film requires the work of putting on an extra layer which plays no part in the reflection efficiency and also has no apparent effect on the outer-surface durability of the finished film.

As far as we are aware all such prior proposals looking toward improvement in any of the factors which enter into physical resistance, have suggested the use of materials of high refraction index in very thin films. The results have been unsatisfactory. The only method of which we are aware and which gives results approaching the results given by our invention, is that of baking the optical element and its deposited film at a temperature of about 250° C. That method seems to produce a film having good physical resistance, but the optical efficiency of the baked film is apt to be lowered, and the heat treatment involves the serious objection of heating a finished optical surface to a relatively high temperature with accompanying warping and deterioration.

In distinction from and contrary to all past proposals we have discovered that with certain combinations of materials deposited and treated under certain procedures, a highly efficient non-reflection film with high physical resistance may be applied to any ordinary optical surface, the film being composed entirely of relatively thick layers each of low refraction index. We are able to provide a highly resistant and adherent film composed of multiple layers, each having a relatively low index, and the outer layer being of substantial thickness in proportion to the total thickness of the film. So far as we are aware, that has not been previously accomplished, all prior proposals having involved the attempted use of relatively dense, high index, material which cannot be used in layers of any appreciable thickness and at the same time maintain any desirable non-reflection efficiency. Our procedure and film structure enable us, on the other hand, to provide an over-layer of a low index, low density, material which is almost or quite as high in non-reflection efficiency as the most efficient known material, and which at the same time gives much better physical resistance than has been previously known. We make that outer layer relatively thick—as thick as ¼ to ⅓ the total thickness (optical thickness) of the film. We have discovered that the outer layer of the somewhat more dense material may be made of such great relative thickness, with an accompanying high physical resistance, and with a reflection efficiency which cannot be explained from purely theoretical considerations based upon the quarter-wave-length theory. In fact, our demonstrated results appear to deny the practical applicability of that theory to the very thin films or layers involved in a non-reflective coating of the type here under consideration, and our results appear to be non-predictable on the basis of that theory, as will be explained later.

The following detailed description sets out typical and preferred materials and procedures which are illustrative of our invention. For the purpose of this description we refer to the accompanying drawing in which Fig. 1 is a diagrammatic illustration of suitable apparatus for our method, and Fig. 2 is a diagram illustrative of the characteristics of our non-reflective film.

In applying our improved film the optical surfaces which are to be treated are first thoroughly cleaned to optical cleaness. Methods for so cleaning optical surfaces are well known and need not be described here. The cleaned elements are then ready to be placed in the vacuum chamber in which the films are deposited.

Figure 2:
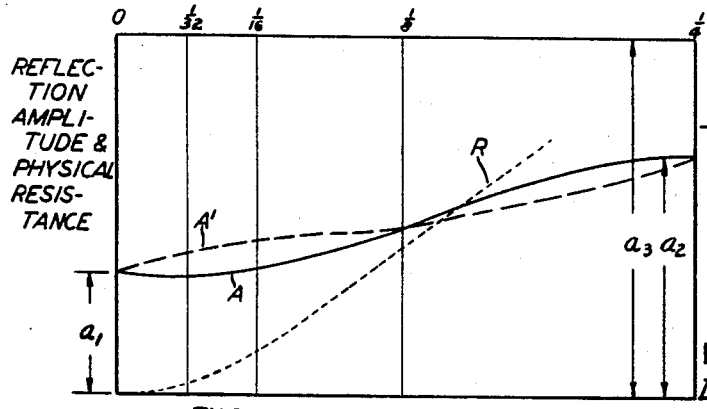

The materials for the two layers of the non-reflection film are fused into solid masses in their respective holders, such as the holders 10 and 11 shown in Fig. 1. These holders may be of any suitable conductive material, preferably of such metals as platinum or tungsten, and may be mounted directly on and between the heating current terminals 12. A circuit 13, 14, 15, 16, including a switch 17, provides for applying low potential current from a low potential transformer T to either of the material holders, for the purpose both of initial fusing and of subsequent vaporization. Fig. 1 merely shows diagrammatically the essentials of the apparatus in simple form. The vacuum chamber 20 may be of any usual form, and is shown as provided with two outlets 21 and 22 which are connected respectively to diffusion pump 23 and mechanical pump 24 by a suitable piping system controlled by valves 25. The arrangement, as is usual, is such that the mechanical pump alone may be applied to the vacuum chamber, or both the mechanical and diffusion pumps may be applied in series to the chamber. If the chamber base 26, and cap 27, are of metal, they are preferably grounded, and the two material holders are also preferably grounded as illustrated.

Fig. 1 also shows a typical and simple arrangement for supporting the optical element E in a position over either holder 10 or 11. For instance, a supporting disk 30 may have shouldered apertures 31 in which the element or elements may be placed to position their lower surfaces directly over the material holders. Disk 30 may be rotatably mounted on a support 32, and any suitable means, such as that shown at 33, may be utilized for rotating the supporting disk to locate the elements. (Any suitable arrangement may be used to insulate support 32 from cover 27, to facilitate the electrical treatments which we describe.) A cover plate 34 may be utilized to protect the upper surface of the optical element from diffuse deposition of material while the lower surface is being coated, and shields, such as those shown in tubular form at 35 may be used in the illustrated positions to minimize diffuse radiation of vapors from holders 10 and 11. Such an arrangement minimizes diffuse or indirect deposition of the materials either onto the surface being coated or onto other surfaces, limiting that deposition substantially to direct radiation of vapor from the material source at the holder onto the surface being coated. The tubular shields may preferably be of glass.

With the optical element in place in the vacuum chamber and with the materials fused into solid masses in their holders, the pressure in the chamber is then lowered to at least substantially $5 \times 10^{-5}$ mm. of mercury and preferably to $10^{-6}$ mm. of mercury. We have found that if the films are laid down under a pressure substantially higher than $5 \times 10^{-5}$, the resulting films are not as physically resistant or as dense and hard as is desired.

While the vacuum is being pumped, all surfaces and materials in the vacuum chamber are outgassed with a high potential discharge, in a manner which is well known and described in the literature. For the purpose of this outgassing operation, and also for the subsequent high potential treatments which we will afterwards describe, the element support, and the optical element, may be connected by a circuit 40 with one side of a high potential transformer T1. The applied high potential may be either D. C. or A. C. The result of outgassing, which is carried on as the vacuum is built up to a point at which the discharge can no longer be maintained, is to remove all residual gasses from exposed surfaces, and also to finally clean the surfaces of the glass elements. We find that improved outgassing results are attained by applying the high potential directly to the element support, as described.

This electrical treatment prior to deposition of the films has not only the usual out-gassing result, but also affects the glass surface in a manner which increases the tenacity of the subsequently deposited film. The electrical treatment is of the nature of electronic bombardment. A piece of glass so treated in the vacuum chamber but removed before film deposition exhibits a peculiar surface texture not present in other glass, a roughness when touched or rubbed with cotton. The roughness disappears after rubbing or handling. Experimental samples of glass which have been treated repeatedly exhibit even greater tenacity than new glass, even though both are subjected to the bombardment for the same period prior to coating. The bombardment consequently seems to have a result which is unique in relation to the coating.

The under-layer of the non-reflective film is then evaporated onto the surface of the optical element by the usual procedure of heating one of the holders, say holder 10, to the vaporizing temperature of the material, with the optical element positioned over that holder. For the material of this under layer we may utilize any of the relatively less dense of the known fluorides, but prefer to use either the mineral known as chiolite, or a mixture of that mineral (90%) with lithium fluoride (10%). Chiolite is a mineral made up of sodium fluoride and aluminum fluoride in a ratio five-to-three. Our best preference at present is to use the pure chiolite for the under-layer. The refractive index of mineral chiolite is 1.349; that of the mixture of chiolite and lithium fluoride is somewhat less. The refractive index of ordinary glasses runs from about 1.5126 to 1.720; that of quartz is 1.54. The index of the evaporated deposited layer is probably somewhat less than that of the solid mineral, but how much less can be only ascertained by interference tests on the thin films, which involves use of the quarter-wave-length theory.

Evaporation of the first or under layer is continued until the thickness desired for that layer is attained, the thickness being determined by interference color change in the layer. For instance, to produce a final film having substantially minimum reflection for ordinary white light, the total optical thickness of the film of two layers is chosen to be about 1350 A.—or about one-quarter of the wave-length 5400 A. in the green. It is of course understood that the chosen quarter wave length thickness depends upon the wave length of the light for which minimum reflection is desired. We are here using a medium wave length of white light as an illustration. We may make the first or under layer from two thirds to three-fourths of the total film thickness, the latter proportion being at present preferred and our present practice. Assuming the latter proportion, in the illustrative case the first or under layer is evaporated onto the optical surface until it is about 1000 A. thick. The interference color test for that thickness is a yellow, and is checked by comparison with the color of a test film whose optical thickness has been measured.

Without relieving the vacuum, the second or outer layer is then immediately evaporated onto the previously deposited under layer, by positioning the optical element over the other material holder 11 and heating that material to the evaporation point. The second or outer layer is then evaporated on until the total film thickness reaches the desired figure, illustratively 1350 A. The thickness is determined again by interference color in the same manner as before, the color being a magenta. It will be understood that we are speaking of optical thicknesses rather than mechanical thicknesses unless otherwise indicated.

The material of the second layer may be any of the more dense of the known fluoride materials, or may be other materials having the desired physical and optical properties. The material for the second or outer layer is somewhat more dense than the material for the under layer and has a somewhat greater refractive index. But the refractive index of the outer layer, like that of the under layer, should be well below that of the glass or other material of the optical element, and its normal density should correspondingly be well below that of the optical element. As a fluoride material for the outer layer we prefer magnesium fluoride, index 1.411. We have found that the magnesium fluoride gives better all round results than any other material which we have so far used for the outer layer.

After the two layers have been deposited under the high vacuum, then the double layer film is given a high voltage treatment. The pressure in the chamber is raised to a point at which the electrical discharge, across a gap of about three inches, will start at about two hundred, or a few hundred, volts. For the purpose of this high potential treatment the element carrier is connected to the high potential circuit. Then the pressure is gradually lowered to between $10^{-2}$ and $10^{-3}$ mm. of mercury (about that which the mechanical pump will maintain) and the voltage of the discharge increases correspondingly to about 1000. Then maintaining the vacuum at about the figure last given, the high potential electrical treatment is continued for a period of about 30 to 45 min. It is desirable to continue the high potential treatment for about that length of time in order to attain the desired physical resistance qualities in the finished film. And if the vacuum chamber contains a minimum of sputterable material, the high potential treatment can be carried on for about that length of time without adversely affecting the treated surface by deposition on it of other materials. For that purpose it is preferable that all metals within the vacuum chamber be relatively non-sputterable, for instance, chromium or tungsten. Making the shields 35 of glass is helpful to the purpose. The ideal vacuum chamber for the purpose is one in which the chamber walls and all parts within the chamber except those that must be of metal are of glass or similar substance, and in which the necessarily metallic parts are of such a metal as tungsten or chromium. In such a perfectly clean chamber, the high voltage treatment may be carried on over a period longer than we have stated without contaminating the treated surfaces with sputtered metal. Tests of films which have been subjected to high voltage treatment over different time periods indicate that the physical resistance qualities of the films improve rapidly up to about 30 minutes. After that the improvement with continued treatment is less rapid, but the improvement continues for at least several hours. After several hours it has been noticed that there is no further improvement in physical resistance qualities, but that certain detrimental effects set in, in the form of higher reflectivity of the film accompanied by a shifting of the interference color curve.

The deposit of the film layers under the specified relative high vacuum produces initially a homogeneous film which is not of a crystalline or mosaic nature. The film remains much more nearly amorphous under adverse conditions and does not develop such a definitely crystalline structure as is found in films deposited under relatively low vacuum. As we have stated, films which are deposited under relatively low vacuum appear to have a tendency to crystallize and flake, showing a mosaic structure under the microscope. They fog easily when exposed to moisture and are of very low physical resistance. Our films, deposited under relatively high vacuum, have none of those disadvantages.

The high voltage treatment, in the nature of an electronic bombardment, undoubtedly increases the density and the refractive index of the film layers. The electrical treatment definitely further improves the physical resistance qualities of the film, and it is our explanation that it does that by densifying the film, or at least its outer portions. But measurements indicate that the high voltage treatment does not decrease the optical efficiency of the film to any substantial degree, while it increases the mechanical efficiency of the film very greatly.

Films deposited in accordance with the foregoing described procedures show relatively high optical efficiency and, at the same time, very high physical resistance. The optical efficiency of films composed of an under layer of chiolite and an outer layer of magnesium fluoride in the thickness ratios given, show an optical efficiency as high as 88 percent. And those same films, subjected to moisture and abrasion tests, show qualities of physical resistance which are at least ten times greater than any previous non-reflective film of which we are aware, with the single exception of the baked film. While other previous films must be very carefully handled to avoid damage, our present film will stand rough and even somewhat careless handling.

Our present explanation, although not one to which we wish to be bound, is briefly and in substance as follows. As we have stated before, numerous tests and measurements have indicated that the results are not in conformance with the quarter-wave-length theory and seem to indicate that, for the very thin films involved, an explanation based on that theory is not practically applicable.

Applied to a film composed of two layers of different indices, the theory leads to the following conclusions when the relative thickness of the two layers is varied. If A represents the amplitude of the over-all reflection from a glass surface of index N coated with a double layer film, and if, $A_1$ = amplitude of reflected ray at the air, outer-film interface;
$A_2$ = same, at the outer-film inner-film interface;
$A_3$ = same, at the inner-film, glass interface;

then $$A_1 = \frac{n_1 - 1}{n_1 + 1}$$

$$A_2 = \frac{n_2 - n_1}{n_2 + n_1}$$

$$A_3 = \frac{N - n_2}{N + n_2}$$

If the total optical thickness of the two film layers be made to equal $L/4$, then it can be shown that:

(I) $\quad A \text{ (total amplitude)} = A_1 - A_3 - A_2 \cos\left(\frac{4\pi n_1 t_1}{L}\right)$ where, $n_1$ = refraction index of outer layer
$n_2$ = refraction index of inner layer
$N$ = refraction index of glass
$L$ = wave length of light
$t$ = mechanical thickness of film.

The first derivative of (I) gives;

(II) $\quad \dfrac{dA}{d(n_1 t_1)} = A_2 \dfrac{4\pi}{L} \sin \dfrac{4\pi n_1 t_1}{L}$ The expression $n_1 t_1$ represents the optical thickness of the outer layer. If that thickness be made equal to half the total film thickness $$\left(\frac{n_1 t_1}{L} = \frac{1}{8}\right)$$

then:

$$\frac{dA}{d(n_1 t_1)} = \frac{4\pi A_2}{L}$$

If that thickness be made zero, the film being composed entirely of the inner layer, then it is found, $$\frac{dA}{d(n_1 t_1)} = 0$$

If that thickness be made $L/4$, the film being composed entirely of the outer layer, then it is found, $$\frac{dA}{d(n_1 t_1)} = 0$$

Assuming that N is greater than $n_1$ which in turn is greater than $n_2$, then the characteristics of the curve represented by (I), representing the over-all reflection amplitude in terms of the optical thickness of the outer layer, are shown in curve A in Fig. 1. $a_1$ represents the total reflection amplitude when the film is totally composed of the under layer; $a_2$ represents the same amplitude when the film is totally composed of the outer layer. $a_3$ may represent the reflection amplitude of the plain, untreated, glass surface. It would be assumed from (I) and curve A that an outer layer of high density and index, fairly thin—say $L/32$, or one eighth the total film thickness—would not materially increase the reflection amplitude over that which is caused by a film composed solely of under layer. And that might be assumed in spite of the fact that $a_2$ for the dense materials which have been proposed (quartz or zircon) would be very high—in fact, higher than $a_3$. One would conclude that the most efficient and durable double-layer film would utilize a comparatively thin but dense outer protective layer.

We have discovered that that is not the fact, and that on the contrary the most effective double-layer film is one which includes a relatively thick outer layer of material of comparatively low density and low index. Investigations and measurements of double-layer films have shown that the actual curve of over-all reflection amplitude has the characteristics shown in the dash-line curve A' in Fig. 1. Measurements of physical resistance of double layer films deposited by our preferred procedures lead to a curve of physical resistance of the characteristics shown in the dotted-line curve R in Fig. 1. Physical resistance increases slowly at first with increasing thickness of the outer layer, and is very low when that layer is around $L/32$. On the other hand the reflection amplitude increases (curve A') very rapidly at first, the reflection curve flattening out at about $L/16$ where the resistance curve has risen to several times its value at and below $L/32$.

The proportionate thickness previously given for the outer layer is represented at $L/16$ on the diagram. At or about that relative thickness the physical resistance has risen to an acceptable and satisfactory value while the reflection amplitude has risen less than half the difference between $a_1$ (reflection amplitude of the under layer alone) and $a_2$ (reflection amplitude of the outer layer alone). An outer layer somewhat thinner than $L/16$ still has good physical characteristics with somewhat greater optical efficiency. On the other hand, an outer layer thicker than $L/16$ has rapidly increasing physical efficiency, while the optical efficiency decreases but little. The outer layer can therefore be made relatively as thick as desired, as long as $a_2$ be kept low—that is, as long as the density and index of the outer layer is kept low. In practice and for present uses, however, we find that there is no need to make the outer layer more than one-quarter to one-third the total film thickness, as such layers give adequate physical efficiency. In general, we find that the important factors are that $a_2$, which corresponds to the normal density and index of the outer layer, should be kept low, and that then that film should be made relatively thick to obtain the desired physical efficiency.

The foregoing discussion, and other tests and measurements which we have made on both double-layer and single layer films raises at least some doubt whether the quarter wave-length theory applies to the very thin film layers or even, in any exact degree, to the thicker films which are here spoken of being a quarter wave-length thick. For such reasons we do not wish to be limited strictly to films which may be exactly a quarter wave-length thick when we use that expression. The total film thickness is in practice made to give the minimum reflection for a certain selected wave length, and it is assumed that the thickness is approximately one quarter of that wave length.

And further, as is well understood, the total film thickness may be any odd multiple of the defined quarter wave-length, and we wish to include such multiple quarter-wave-length thicknesses within the term quarter-wave-length as here used.

We claim:

1. Low reflectance light transmitting element in which a surface of a partially reflecting transparent body, having a thickness greater than the quarter-wave-length herein referred to, is provided with a film of low refractive index and of an optical thickness approximately one-quarter wave length of selected light for which minimum reflection is desired; characterized by the film being composed of two superimposed layers of transparent materials, the refractive index of each layer being substantially less than that of the transparent body, the outer layer being of substantially greater density and refractive index than the inner layer, and the outer layer and the inner layer each having a thickness which is a substantial fraction of the total quarter-wave-length thickness of the film.

2. Low reflectance light transmitting element in which a surface of a partially reflecting transparent body, having a thickness greater than the quarter-wave-length herein referred to, is provided with a film of low refractive index and of an optical thickness approximately one-quarter wave length of selected light for which minimum reflection is desired; characterized by the film being composed of two superimposed layers of transparent materials, the refractive index of each layer being substantially less than that of the transparent body, the outer layer being of substantially greater density and refractive index than the inner layer, and the outer layer and the inner layer each having a thickness which is between approximately one-quarter and one-half the total quarter-wave-length thickness of the film.

3. Low reflectance transmitting element as specified in claim 1 in which the transparent body has a refractive index of not less than approximately 1.510; and in which the inner film layer has an index of approximately 1.33, the denser outer layer has an index of approximately 1.43, and the thickness of the outer layer being between approximately one-quarter and one-half the total quarter-wave-length thickness of the film.

4. Low reflectance transmitting element as specified in claim 1, and in which the outer film layer is superficially densified.

5. Low reflectance transmitting element as specified in claim 1 in which the transparent body has a refractive index of not less than approximately 1.510; and in which the inner film layer has an index of approximately 1.33, the denser outer layer has an index of approximately 1.43, the thickness of the outer layer being between approximately one-quarter and one-half the total quarter-wave-length thickness of the film, and the outer film layer being superficially densified.

DOROTHY LLEWELLYN RICHARDS.
WILLIAM C. MILLER.